United States Patent
Wendt et al.

(10) Patent No.: US 12,156,493 B2
(45) Date of Patent: Dec. 3, 2024

(54) ZERO-TURN VEHICLE WITH DRIVELINE CONTROL

(71) Applicant: TEAM Industries, Inc., Bagley, MN (US)

(72) Inventors: Ronald Joseph Wendt, Bemidji, MN (US); Michael Allen Mueller, Bemidji, MN (US); Micah Ryan Ricke, Bemidji, MN (US); Karl Michael Leisenheimer, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 262 days.

(21) Appl. No.: 17/741,137

(22) Filed: May 10, 2022

(65) Prior Publication Data

US 2022/0354048 A1 Nov. 10, 2022

Related U.S. Application Data

(60) Provisional application No. 63/186,645, filed on May 10, 2021.

(51) Int. Cl.
*A01D 34/00* (2006.01)
*B60W 30/02* (2012.01)
*B60W 30/182* (2020.01)
*B60W 50/08* (2020.01)
*A01D 101/00* (2006.01)

(52) U.S. Cl.
CPC .......... *A01D 34/006* (2013.01); *B60W 30/02* (2013.01); *B60W 30/182* (2013.01); *B60W 50/087* (2013.01); *A01D 2101/00* (2013.01)

(58) Field of Classification Search
None
See application file for complete search history.

(56) References Cited

U.S. PATENT DOCUMENTS

| | | | |
|---|---|---|---|
| 2020/0205338 A1* | 7/2020 | Zeiler | B62D 1/046 |
| 2021/0195834 A1* | 7/2021 | Arendt | G05D 1/0236 |
| 2021/0252976 A1* | 8/2021 | Nahrwold | B60L 7/10 |
| 2022/0163332 A1* | 5/2022 | Hiramatsu | G01C 21/34 |

* cited by examiner

*Primary Examiner* — Tamara L Weber
(74) *Attorney, Agent, or Firm* — Fogg & Powers LLC

(57) ABSTRACT

A zero-turn vehicle including a mode selection interface, a memory and at least one controller is provided. The mode selection interface provides a mode section input for a user. The memory is used to store mode instructions relating to at least one operation mode. The at least one controller in communication with the mode selection interface and the memory, the at least one controller configured to selectively modify normal operating characteristics of the zero-turn vehicle based the mode selection input from the user by implementing the stored mode instructions associated with the mode selection input.

16 Claims, 15 Drawing Sheets

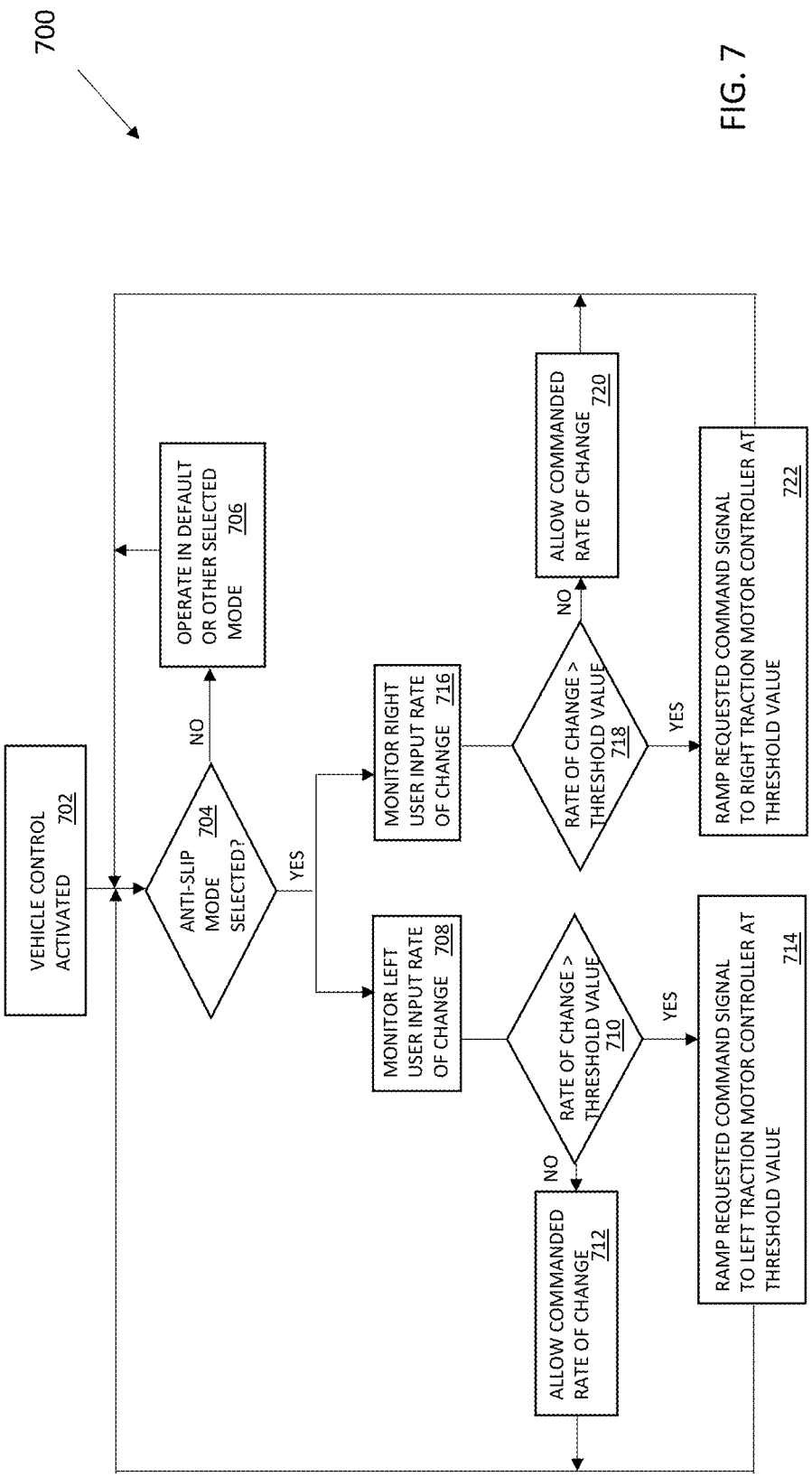

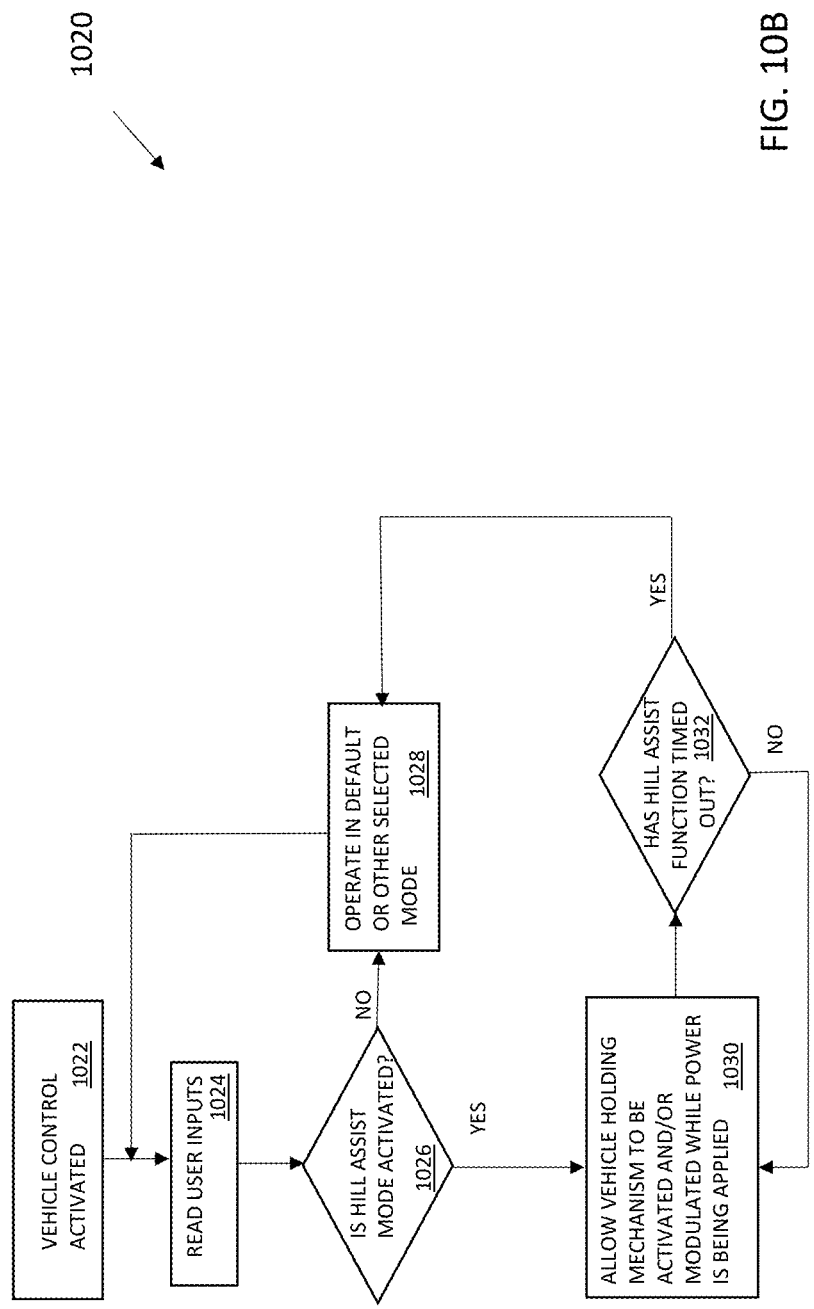

ZERO-TURN VEHICLE WITH DRIVELINE CONTROL

CROSS-REFERENCE TO RELATED APPLICATIONS

This Application claims priority to U.S. Provisional Application Ser. No. 63/186,645, same title herewith, filed on May 10, 2021, which is incorporated in its entirety herein by reference.

BACKGROUND

Zero turn vehicles, such as zero turn mowers are popular because they enable a vehicle to turn with essentially a zero turning radius. This allows for quick and efficient vehicle travel paths while traversing over a lawn. The ability to turn so effectively is provided with the use of two drive wheels whose rotation are independently controlled. Steering is achieved by changing the number of rotations of drive wheels in relation to each other. In a common configuration, two inputs, that protrude out from a body of zero turn vehicle from opposing sides of a seat of the vehicle where an operator sits, are used to independently control the rotations of the wheels to control both the speed and navigation of the vehicle.

SUMMARY OF INVENTION

The following summary is made by way of example and not by way of limitation. It is merely provided to aid the reader in understanding some of the aspects of the subject matter described. Embodiments provide a zero-turn vehicle with select operating modes that modify the normal operating characteristics of the vehicle to enhance vehicle performance during select situations.

In one embodiment, a zero-turn vehicle including a mode selection interface, a memory and at least one controller is provided. The mode selection interface provides a mode section input for a user. The memory is used to store mode instructions relating to at least one operation mode. The at least one controller in communication with the mode selection interface and the memory, the at least one controller configured to selectively modify normal operating characteristics of the zero-turn vehicle based the mode selection input from the user by implementing the stored mode instructions associated with the mode selection input.

In another embodiment, a zero-turn vehicle including a first drive wheel, a first traction motor, a second drive wheel, a second traction motor, at least one user input, a memory and at least one controller is provided. The first traction motor is coupled to provide torque to the first drive wheel. The second traction motor is coupled to provide torque to the second drive wheel. The at least one user input is used to generate at least one of a vehicle direction signals and vehicle speed signals. The memory is used to store mode instructions relating to operation modes of the zero-turn vehicle. The least one controller is in communication with the first traction motor, the second traction motor and the memory. The at least one controller is configured to implement the mode instructions for at least one operation mode to cause at least one first and second traction control motors to vary at least one of torque, RPM and power independent of at least one of vehicle direction signals and the vehicle speed signals from the at least one user input.

In still another embodiment, a method of controlling a zero-turn vehicle is provided. The method includes generating at least one of vehicle direction signals, vehicle speed signals, and vehicle acceleration signals with at least one user input; modifying at least one of the vehicle direction signals, vehicle speed signals, and vehicle acceleration signals from the at least one user input based on operational mode instructions to generate first traction control signals configured to control a first traction motor and second traction control signals configured to control a second traction motor, wherein the operational mode instructions modify the at least one vehicle direction signals, vehicle speed signals and vehicle acceleration signals based at least in part on a difference between the at least one vehicle direction signals, the vehicle speed signals and the vehicle acceleration signals used to control the first traction control motor and the second traction control motor.

BRIEF DESCRIPTION OF THE DRAWINGS

The present invention can be more easily understood and further advantages and uses thereof will be more readily apparent, when considered in view of the detailed description and the following figures in which:

FIG. 7 illustrates an anti-slip mode flow diagram according to one exemplary embodiment;

FIG. 10B illustrates a hill assist restart flow diagram according to another exemplary embodiment;

In accordance with common practice, the various described features are not drawn to scale but are drawn to

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a zero-turn vehicle with one or more operating modes that modify or override the normal operating characteristics of the vehicle such as the normal driveline operating characteristics of the vehicle or the normal operating mower deck characteristics in a mower example, to enhance vehicle performance during select situations.

Figure 1:
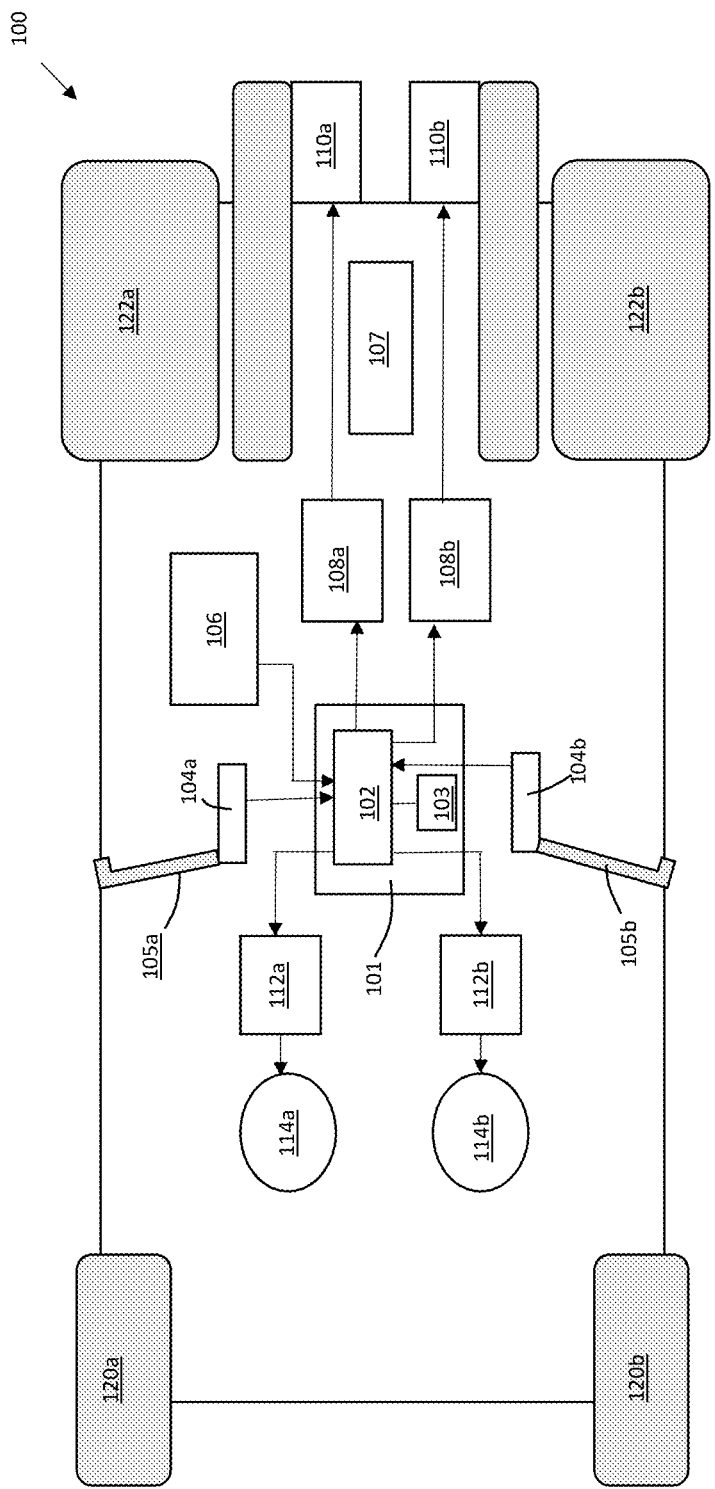
FIG. 1 is a block diagram of a zero-turn vehicle according to one exemplary embodiment.

Referring to FIG. 1, a block diagram of a zero-turn vehicle 100 with driveline control of an example embodiment is illustrated. The vehicle 100 includes a vehicle control 101 that provides operational control of the wheels 122a and 122b. The vehicle control 101 in this example includes a vehicle controller 102 and a memory 103. Other types of control may be used.

In one example, the zero-turn vehicle 100 is an electric vehicle. In other embodiments, the vehicle may be another type of vehicle such as a vehicle with an internal combustion engine using hydrostatic drive wheel control. The vehicle 100 of FIG. 1 is illustrated as including a power source 107 which may include one or more batteries in an electrical vehicle example or an internal combustion engine in another example.

Further, although some of the embodiments are described as applying to zero-turn mower, other applications are not limited to a specific type of vehicles. Other types of vehicles may include, but are not limited to, golf carts, snowblowers, garden tractors, stock chasers, etc.

In general, the vehicle controller 102 may include any one or more of a processor, microprocessor, a digital signal processor (DSP), an application specific integrated circuit (ASIC), a field program gate array (FPGA), or equivalent discrete or integrated logic circuitry. In some example embodiments, vehicle controller 102 may include multiple components, such as any combination of one or more microprocessors, one or more controllers, one or more DSPs, one or more ASICs, one or more FPGAs, as well as other discrete or integrated logic circuitry. The functions attributed to the controller 102 herein may be embodied as software, firmware, hardware or any combination thereof. The vehicle controller 102 may be part of a system controller or a component controller. The memory 103 may include computer-readable operating instructions that, when executed by the controller 102 provides functions of the vehicle 100. Such functions may include the functions of the driveline control described below. The computer readable instructions may be encoded within the memory 103. Memory 103 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The example vehicle 100 of FIG. 1 further includes right and left levers 105a and 105b (or first and second levers) that provide a user interface. The right and left levers 105a and 105b are in communication with right and left user inputs 104a and 104b (or first and second inputs). The right and left user inputs 104a and 104b may each include a neutral switch in this example. Other types of a user (or operator) interface may be used to convey operator actions to the user inputs 104a and 104b including but not limited to, one or more joy sticks, a steering wheel, graphical user interface (GUI), etc. The user inputs 104a and 104b are in communication with the vehicle controller 102 of the vehicle control 101.

The vehicle 100 in this example includes a mode select interface 106. The mode select interface 106 is also in communication with the vehicle controller 102. The mode select interface 106 provides an input for the user to convey to the vehicle controller 102 a desired operating mode for the vehicle 100 as discussed below in detail. The mode select interface 106 may include any type of signal generating device such as, but not limited to, a switch, GUI, etc., which allows the operator to convey to the vehicle controller 102 the desired operating mode. Other embodiments may employ one or more select operation modes automatically without a specific mode select interface.

The vehicle 100 in an electric mower example includes deck motor for each cutting blade in a mowing deck. The example vehicle 100 of FIG. 1 includes a right deck motor 114a and a left deck motor 114b (or first and second deck motor) to rotate associated cutting blades. Other types of blade rotating systems may be used such as hydraulic, belts, etc. in other example embodiments. Right and left deck motor controllers 112a and 112b (or first and second deck motor controllers) are in communication with the associated right and left deck motors 114a and 114b to control the right and left deck motors. Embodiments with mower decks that have less than two blades and more than two blades would include the appropriate number of deck motors or other blade rotation systems. The right and left deck motors 114a and 114b are in communication with the vehicle controller 102.

The vehicle includes right and left drive wheels 122a and 122b (or first and second drive wheels). A right traction motor 110a (or first traction motor) provides select torque to the right drive wheel 122a to move the right drive wheel 122a at a desired speed as well as in a select rotation direction. A left traction motor 110b (or second traction motor) provides select torque to the left drive wheel 122b to move the left drive wheel 122b at a desired speed as well as in select rotation direction. A right traction motor control 108a (or first traction motor control) is in communication with the right traction motor 110a to control the right traction motor 110a. A left traction motor control 108b (or second traction motor control) is in communication with the left traction motor 110b to control the left traction motor 110b. The vehicle controller 102 is in communication with the right and left traction motor controls 108a and 108b. Also illustrated in FIG. 1 are front wheels 120a and 120b that are free to rotate/or swivel. Other embodiments, such as a garden tractor embodiment, may only employ one traction motor to provide toque to the drive wheels. Hence, the number of traction motors may vary in embodiments.

The vehicle controller 102 in an example embodiment, modifies or overrides normal operations of a vehicle through the right and left deck motor controllers 112a and 112b and the right and left traction motor controls 108a and 108b based on at least one of instructions relating to operation modes stored in the memory 103, user inputs and sensor data. In at least some examples, the mode instructions stored in memory 103, cause the right and left traction motor controls 108a and 108b to vary at least one of torque, revolution per minute (RPM), and power independent of at least one of vehicle direction signals, vehicle speed signals and vehicle accretion signals generated from the user inputs 104a and 104b.

FIG. 2 through FIG. 11 provide operation mode flow diagrams that illustrate how the vehicle controller 102 overrides or modifies normal operating characteristics of the vehicle based on an operation mode by implementing stored instructions stored in the memory 103 that are associated with an operation mode. The flow diagrams are provided as a sequence of blocks. The sequence may be different or may even run parallel in other embodiments. Hence, embodiments are not limited to the specific sequence set out in the flow diagrams.

Figure 2:
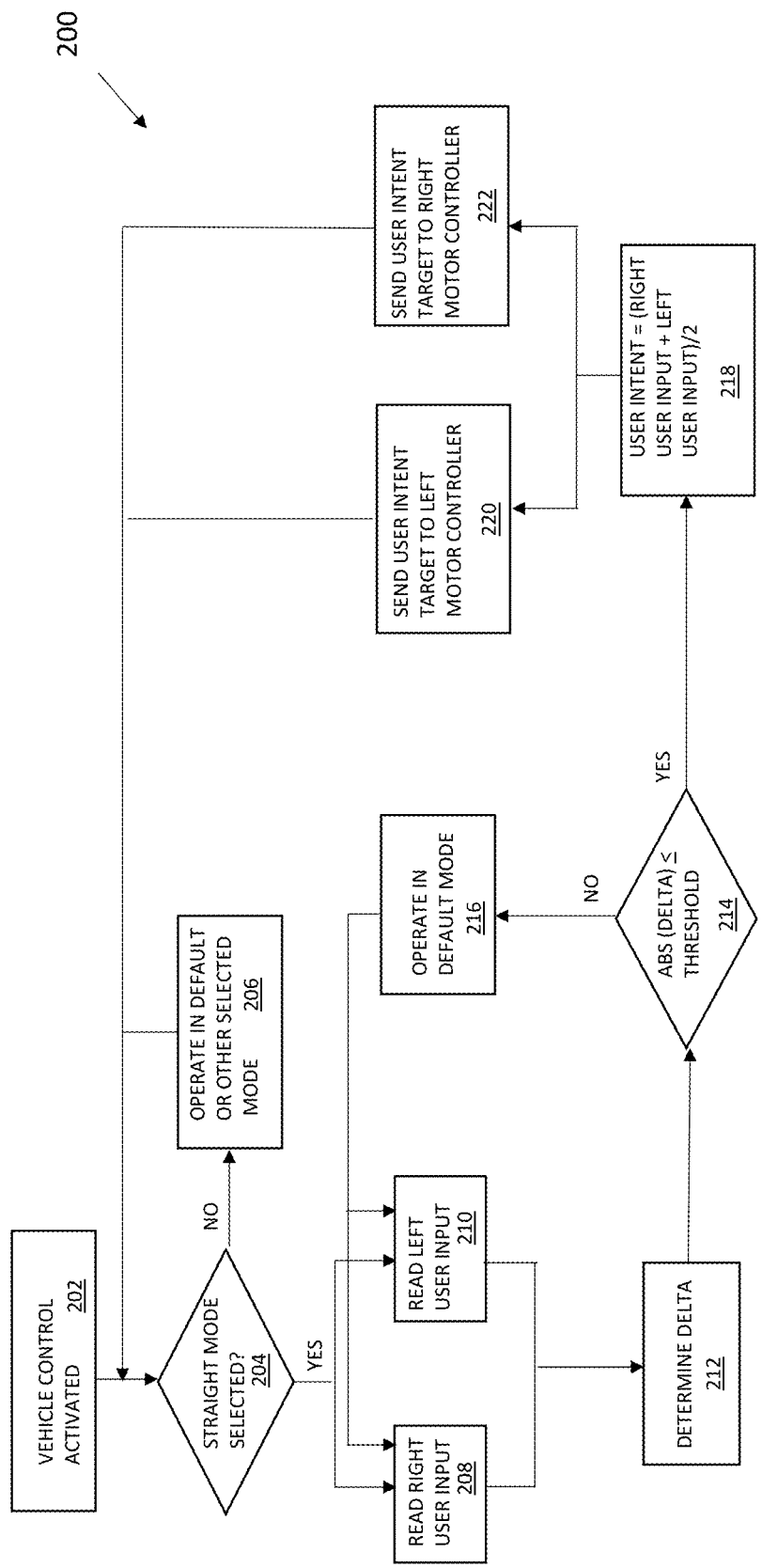
FIG. 2 illustrates a straight mow mode flow diagram according to one exemplary embodiment.

Referring to FIG. 2, a straight mow mode flow diagram 200 of an example embodiment is illustrated. The straight mow mode is an operation mode that is selected when a user wants to keep the mower going in straight path without incidental movements measured by the user inputs 104a and 104b that may cause deviations in the straight path. The straight mow mode averages the speed of the right and left drive wheels 122a and 122b when the user intends to traverse in a straight line. The straight mow mode flow diagram 200 is initiated when a vehicle control is activated at block (202). It is then determined at block (204) if the straight mode has been selected. If the straight mode has not been selected at block (204), the vehicle controller 102 operates the vehicle 100 in a default mode or other selected mode at block (206). The process then continues at block 204.

If the straight mow mode is selected at block (204), the right user input 104a is read at block (208) and the left user input 104b is read at block (210). At block (212) a difference (or delta) is determined by subtracting the left user input 104b from the right user input 104a in this example. It is then determined at block 214 if an absolute delta is less than or equal to a select threshold. If the absolute delta is not less than or equal to a select threshold, the vehicle controller 102 operates the vehicle in a default mode at block (216) and the process continues at blocks (208) and (209). If it is determined at block (214) that the absolute delta is less than or equal to a select threshold, a user intent is determined at block (218) by adding the right user input 104a and the left user input 104b and dividing by two to get the average. At block (220) the determined user intent is sent to the left motor control 108b and at block (222) the determined user intent is sent to the right motor control 108a to keep the mower in straight mowing line. The process then continues at block (204). In another example, instead of using an average, a maximum or minimum value could be used instead. The straight mow mode is an example of an operation mode that a vehicle producer may include in a vehicle without requiring a user selection.

FIGS. 3-6 illustrate different example embodiments of a turf friendly mode that is designed to protect the turf by regulating the difference between speeds of the first drive wheel 122a and the second drive wheel 122b so neither of the wheels tear up the turf. The embodiments provide an electronic differential function. Although, a preferred embodiment may be to provide the turf friendly mode as a selectable mode option, the turf friendly mode may also be an operation mode that a vehicle producer includes without requiring a user selection of the mode.

Figure 3:
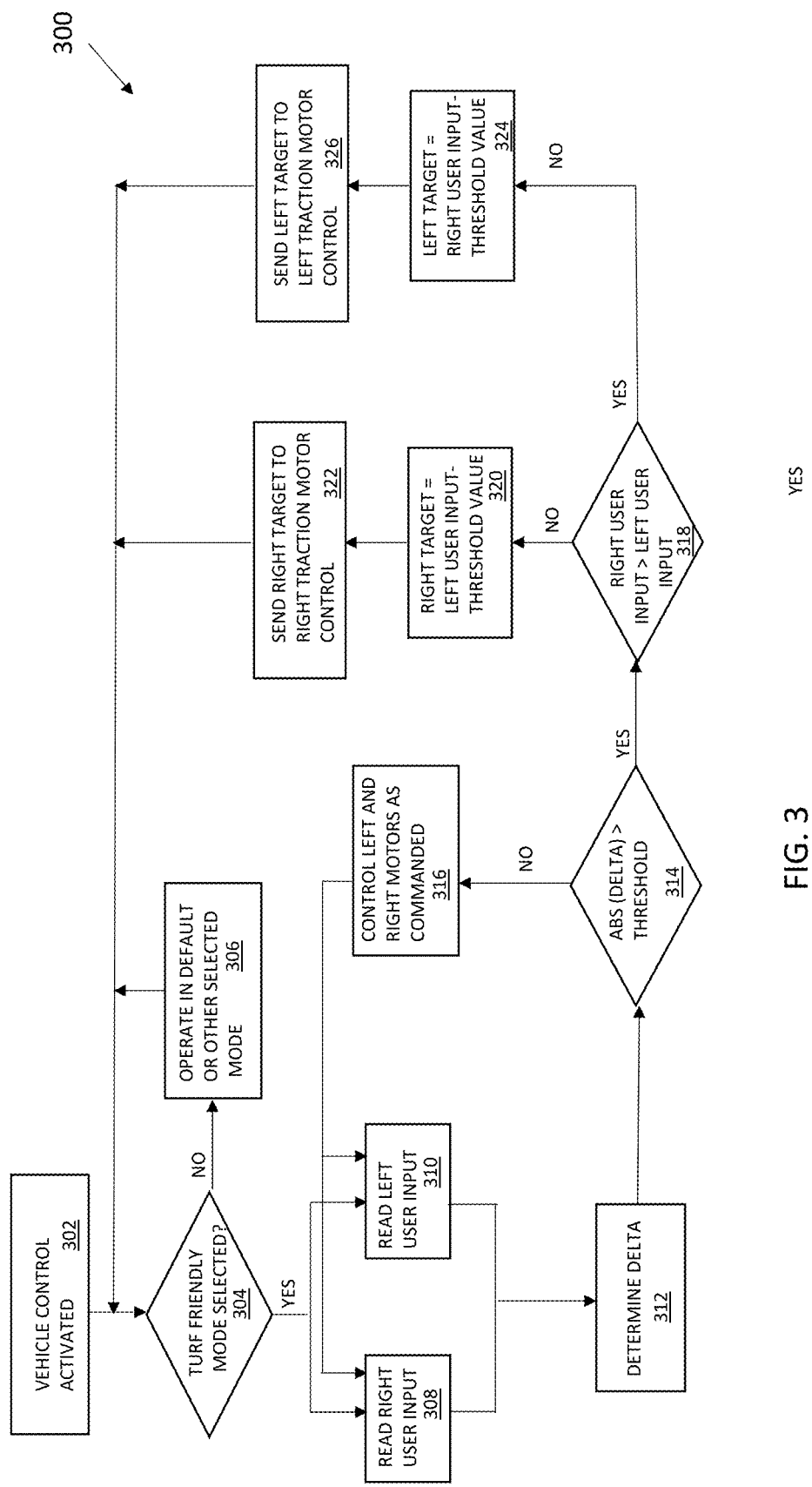
FIG. 3 illustrates a turf friendly mode flow diagram according to one exemplary embodiment.

Referring to FIG. 3, a first example of a turf friendly mode is illustrated in the friendly mode flow diagram 300. The turf friendly mode in this example selectively increases speed of the slower wheel to prevent a tighter turning radius than is physically allowed without damaging the turf. The process starts at block (302) when the vehicle control 101 is activated. It is then determined at block (304) if the turf friendly mode is selected. If the turf friendly mode is not selected at block (304), the vehicle 100 operates in a default mode or other selected mode as indicated at block (306). The process then continues at block (304).

If the turf friendly mode is selected at block (304), values of the right and left user inputs 104a and 104b are read at blocks (308) and (310) respectively. A difference between the right user input value and the left user input value is determined at block (312). It is then determined if an absolute difference between the input values is greater than a select threshold at block (314).

If the absolute difference is not greater the select threshold, control of the right and left traction motors 110a and 110b are controlled as commanded (i.e., normal operation based on user inputs 104a and 104b) at block (316) and the process continues at blocks (308) and (310). If the absolute difference is greater the select threshold, then it is determined if the right user input 104a is greater than the left user input 104b at block (318). If it is determined at block (318) that a right user input value is not greater than the left user input value, a right target value is set equal to a left user input value minus the threshold value at block (320). The right target value is then sent to the right traction motor control 108a at block (322). This is used to adjust the speed of the right drive wheel 122a independent from a user input. The process then continues at block (304).

If it is determined at block (318) that the right user input value is greater than the left user input value, a left target value is set equal to the right user input value minus the threshold value at block (324). The left target value is then sent to the left traction motor control 108b at block (326). This is used to adjust the speed of the left drive wheel 122b independent from a user input. The process then continues at block (304).

Figure 4:
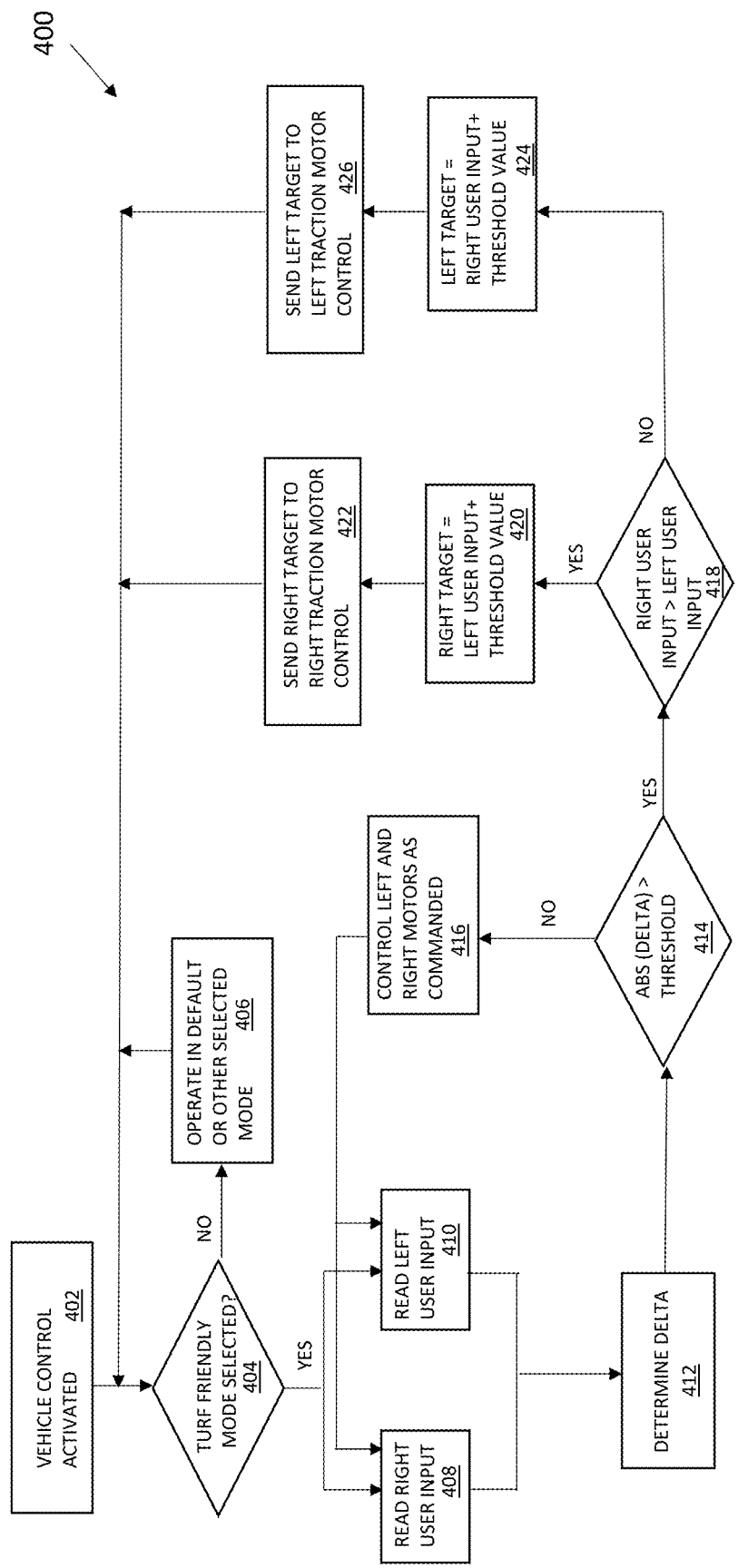
FIG. 4 illustrates another turf friendly mode flow diagram according to one exemplary embodiment.

Another example of a turf friendly mode flow diagram 400 is illustrated in FIG. 4. This process starts at block (402) when the vehicle control 101 is activated. It is then determined at block (404) if the turf friendly mode is selected. If the turf friendly mode is not selected at block (404), the vehicle 100 operates in a default mode or other selected mode as indicated at block (406). The process then continues at block (404).

If the turf friendly mode is selected at block (404), right and left user input values from the right and left inputs 104a and 104b are read at blocks (408) and (410) respectively. A delta or difference between the right user input value and the left user input value is determined at block (412). It is then determined if an absolute difference between the input values is greater than a select threshold at block (414).

If the absolute difference is not greater than the select threshold, control of the left and right traction motors 110a and 110b are controlled as commanded (i.e. normal operation based on user inputs 104a and 104b) at block (416) and the process continues at blocks (408) and (410). If the absolute difference is greater the select threshold, then it is determined if the right user input value is greater than the left user input value at block (418). If it is determined at block (418) that the right user input value is greater than the left user input value, a right target value is set equal to the left user input value plus the threshold value at block (420). The right target value is then sent to the right traction motor control 108a at block (422). This is used to adjust the speed of the right drive wheel 122a. The process then continues at block (404).

If it is determined at block (418) that the right user input value is not greater than the left user input value, a left target value is set equal to the right user input value plus the threshold value at block (424). The left target value is then sent to the left traction motor control 108b at block (426). This is used to adjust the speed of the left drive wheel 122b. The process then continues at block (404).

Figure 5:
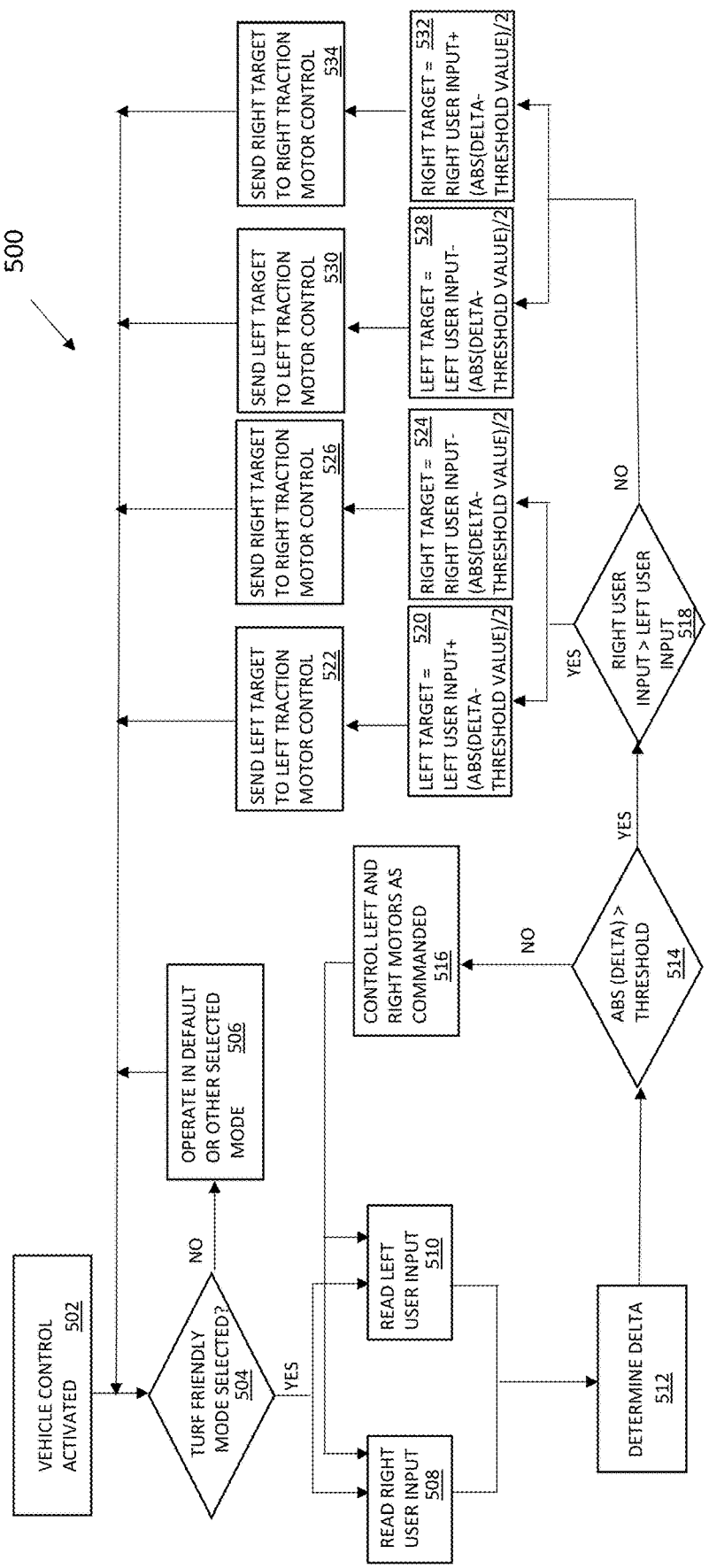
FIG. 5 illustrates still another turf friendly mode flow diagram according to one exemplary embodiment.

Further another example of a turf friendly mode flow diagram 500 is illustrated in FIG. 5. This process starts at block (502) when the vehicle control 101 is activated. It is then determined at block (504) if the turf friendly mode is selected. If the turf friendly mode is not selected at block (504), the vehicle operates in a default mode or other selected mode as indicated at block (506). The process then continues at block (504).

If the turf friendly mode is selected at block (504), values of the right and left user inputs 104a and 104b are read at blocks (508) and (510) respectively. A delta or difference between the right user input value and the left user input value is determined at block (512). It is then determined if an absolute difference between the inputs is greater than a select threshold at block (514).

If the absolute difference is not greater than the select threshold, control of the left and right motors 110a and 110b are controlled as commanded (i.e. normal operation based on user input) at block (516) and the process continues at blocks (508) and (510). If the absolute difference is greater the select threshold at block (514), then it is determined if the right user input value is greater than the left user input value at block (518). If it is determined at block (518) that the right user input value is greater than the left user input value, a left target value is set equal to the left user input value plus the absolute value of the difference minus the threshold value divided by two at block (520). The determined left target value is sent to the left traction motor control 108b at block (522). Further if it is determined at block (518) that the right user input value is greater than the left user input value, a right target value is set equal to the right user input value minus the absolute value of the difference minus the threshold value divided by two at block (524). The determined right target value is sent to the right traction motor control 108a at block (526).

If it is determined at block (518) that the right user input value is not greater than the left user input value, a left target value is set equal to the left user input value minus the absolute value of the difference minus the threshold value divided by two at block (528). The determined left target value is sent to the left traction motor control 108b at block (530). Further if it is determined at block (518) that the right user input value is not greater than the left user input value, the right target value is set equal to the right user input value plus the absolute value of the difference minus the threshold value divided by two at block (532). The determined right target value is sent to the right traction motor control 108a at block (534). As illustrated in FIG. 5, after the determination of the left and right target values, the process continues at block (504).

The turf friendly mode flow diagrams 300, 400 and 500 described above use inputs, such as the right and left user inputs 104a and 104b (or first or second user inputs), in determining if the speed of one or both of the drive wheels need to be adjusted to prevent damaging of a lawn. Other embodiments may use outputs associated with the right and left wheels 122a and 122b such as, but not limited to, wheel speed sensors. The wheel speed sensors may be part of the right and left traction motors 110a and 110b, part of other components of the vehicle or they may be separate sensors that either directly or indirectly measure the speed of the respective drive wheels 122a and 122b. Examples of embodiments of turf friendly modes using outputs instead of inputs are illustrated in FIGS. 6A, 6B and 6C.

Figure 6A:
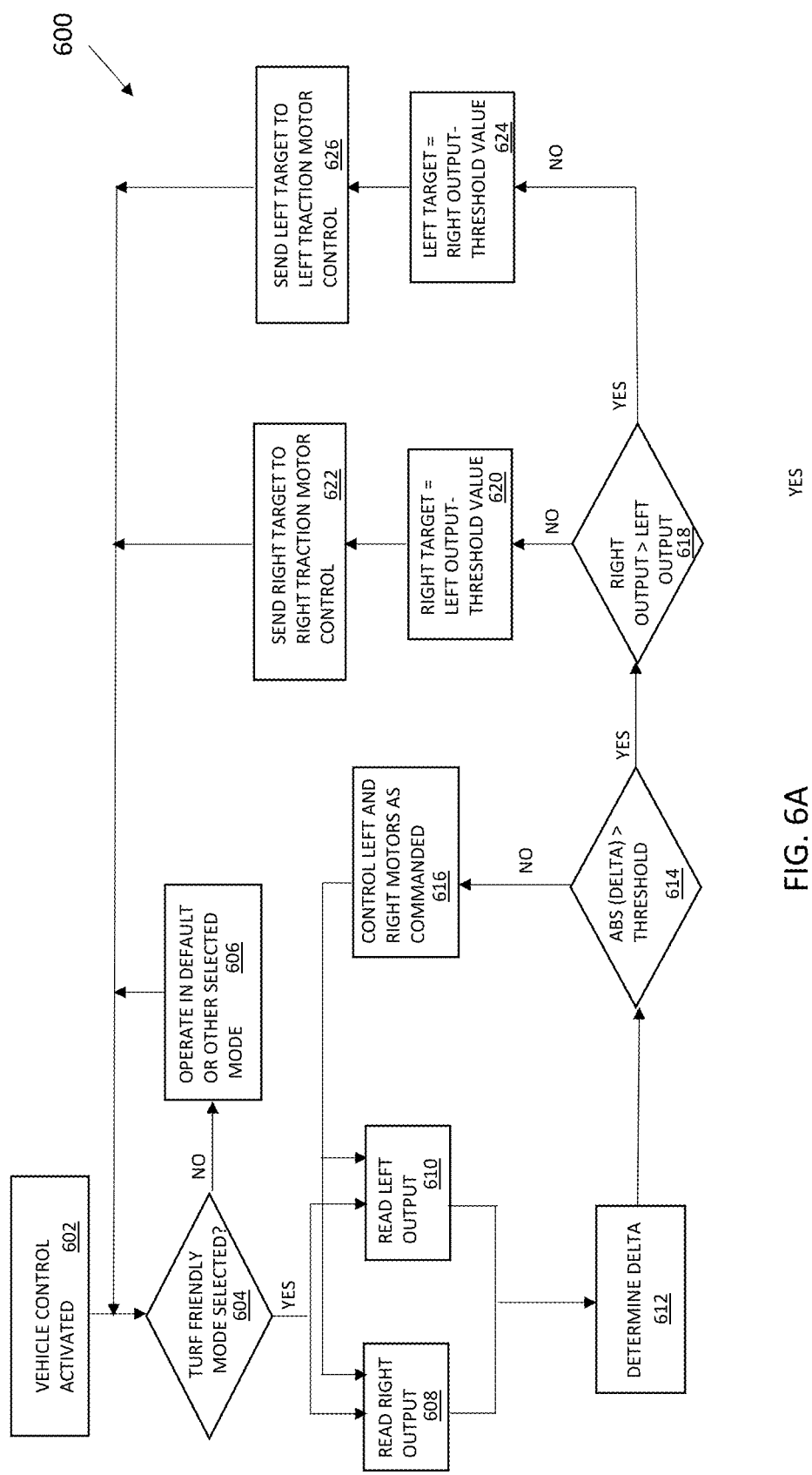
FIG. 6A illustrates a turf friendly mode flow diagram using outputs instead of inputs according to one exemplary embodiment.
Figure 6B:
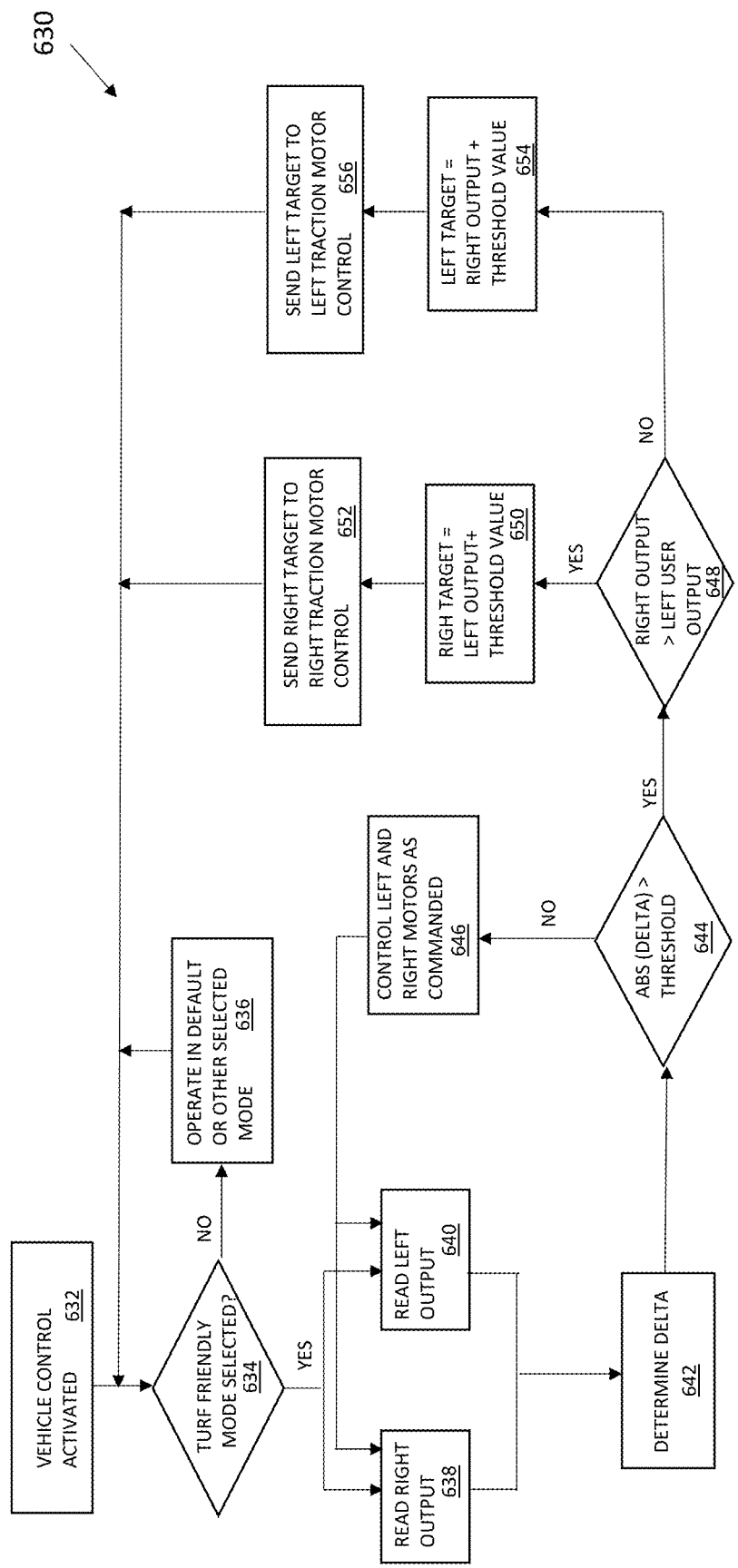
FIG. 6B illustrates another turf friendly mode flow diagram using outputs instead of inputs according to one exemplary embodiment.
Figure 6C:
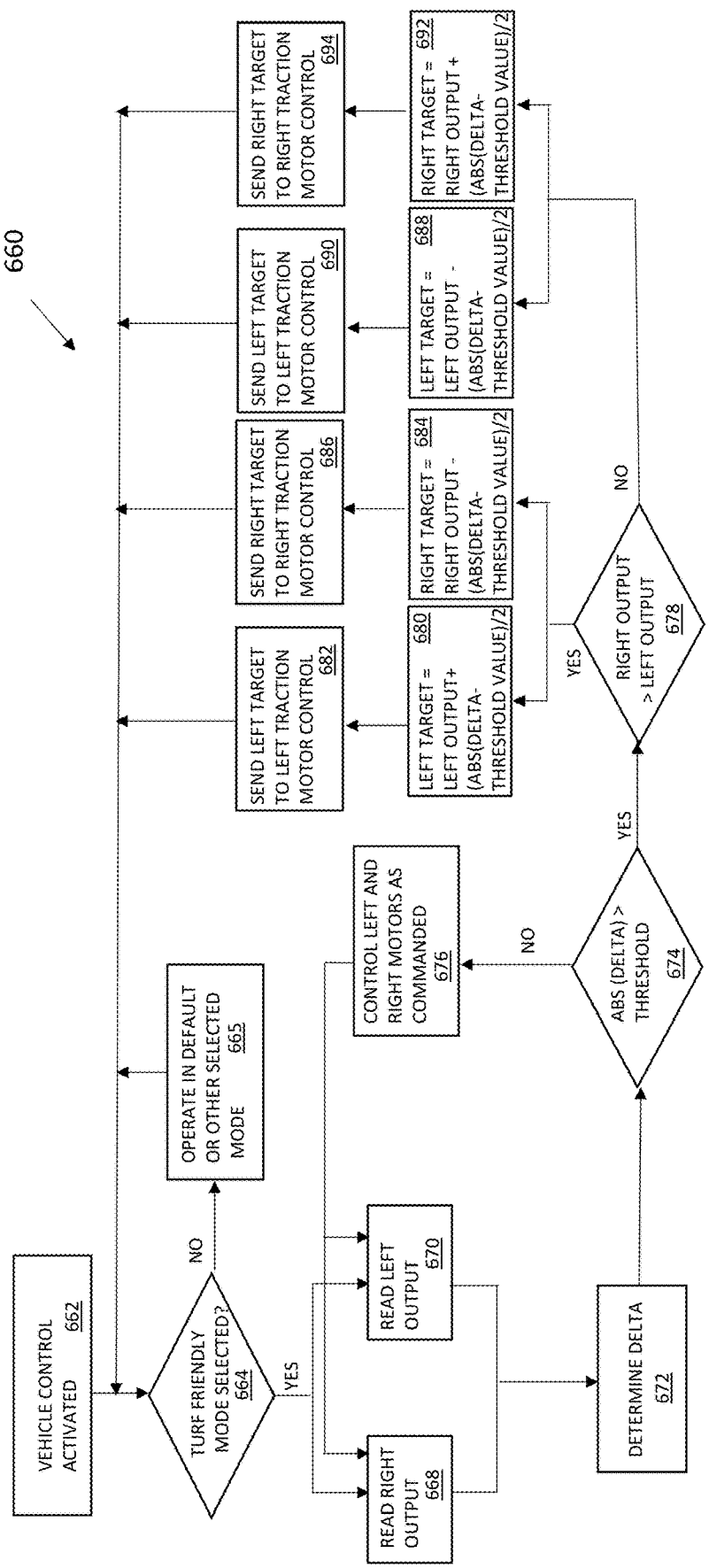
FIG. 6C illustrates yet another turf friendly mode flow diagram using outputs instead of inputs according to one exemplary embodiment.

For example, a turf friendly mode flow diagram 600 using right and left outputs is illustrated in FIG. 6A. The process starts at block (602) when the vehicle control 101 is activated. It is then determined at block (604) if the turf friendly mode is selected. If the turf friendly mode is not selected at block (604), the vehicle operates in a default mode or other selected mode as indicated at block (606). The process then continues at block (604).

If the turf friendly mode is selected at block (604), the right and left output values are read at blocks (608) and (610) respectively. A difference between the right output value and the left output value is determined at block (612). It is then determined if an absolute difference between the output values is greater than a select threshold at block (614).

If the absolute difference is not greater than the select threshold, control of the left and right motors 122a and 122b are controlled as commanded (i.e. normal operation based on user input) at block (616) and the process continues at blocks (608) and (610). If the absolute difference is greater than the select threshold, then it is determined if the right output value is greater than the left output value at block (618). If it is determined at block (618) that the right output value is not greater than the left output value, a right target value is set equal to the left output minus the threshold value at block (620). The right target value is then sent to the right traction motor control 108a at block (622). This is used to adjust the speed of the right drive wheel 122a. The process then continues at block (604).

If it is determined at block (618) that the right output value is greater than the left output, a left target value is set equal to the right output value minus the threshold value at block (624). The left target value is then sent to the left traction motor control 108b at block (626). This is used to adjust the speed of the left drive wheel 122b. The process then continues at block (604).

Turf friendly mode flow diagram 630 is illustrated in FIG. 6B. This process starts at block (632) when the vehicle control 101 is activated. It is then determined at block (634) if the turf friendly mode is selected. If the turf friendly mode is not selected at block (634), the vehicle 100 operates in a default mode or other selected mode as indicated at block (636). The process then continues at block (634).

If the turf friendly mode is selected at block (634), right and left output values are read at blocks (638) and (640) respectively. A delta or difference between the right output value and the left output value is determined at block (642). It is then determined if an absolute difference between the output values is greater than a select threshold at block (644).

If the absolute difference is not greater than the select threshold, control of the left and right traction motors 110a and 110b are controlled as commanded (i.e., normal operation based on user inputs 104a and 104b) at block (646) and the process continues at blocks (638) and (640). If the absolute difference is greater than the select threshold, then it is determined if the right output value is greater than the left output value at block (648). If it is determined at block (648) that the right output value is greater than the left output value, a right target value is set equal to the left output value plus the threshold value at block (650). The right target value is then sent to the right traction motor control 108*a* at block (652). This is used to adjust the speed of the right drive wheel 122*a*. The process then continues at block (634).

If it is determined at block (648) that the right output value is not greater than the left output value, a left target value is set equal to the right output value plus the threshold value at block (654). The left target value is then sent to the left traction motor control 108*b* at block (656). This is used to adjust the speed of the left drive wheel 122*b*. The process then continues at block (634).

Turf friendly mode flow diagram 660 is illustrated in FIG. 6C. This process starts at block (662) when the vehicle control 101 is activated. It is then determined at block (664) if the turf friendly mode is selected. If the turf friendly mode is not selected at block (664), the vehicle operates in a default mode or other selected mode as indicated at block (665). The process then continues at block (664).

If the turf friendly mode is selected at block (664), values of the right and left outputs are read at blocks (668) and (670) respectively. A delta or difference between the right output value and the left output value is determined at block (672). It is then determined if an absolute difference between the outputs is greater than a select threshold at block (674).

If the absolute difference is not greater than the select threshold, control of the left and right motors 110*a* and 110*b* are controlled as commanded (i.e., normal operation based on user input) at block (676) and the process continues at blocks (668) and (670). If the absolute difference is greater than the select threshold at block (674), then it is determined if the right output value is greater than the left user input value at block (678). If it is determined at block (678) that the right output value is greater than the left output value at block (678), a left target value is set equal to the left output value plus the absolute value of the difference minus the threshold value divided by two at block (680). The determined left target value is sent to the left traction motor control 108*b* at block (682). Further if it is determined at block (678) that the right output value is greater than the left user input value, a right target value is set equal to the right output value minus the absolute value of the difference minus the threshold value divided by two at block (684). The determined right target value is sent to the right traction motor control 108*a* at block (686).

If it is determined at block (678) that the right output value is not greater than the left output value, a left target value is set equal to the left output value minus the absolute value of the difference minus the threshold value divided by two at block (688). The determined left target value is sent to the left traction motor control 108*b* at block (690). Further if it is determined at block (678) that the right output value is not greater than the left output value, the right target value is set equal to the right output value plus the absolute value of the difference minus the threshold value divided by two at block (692). The determined right target value is sent to the right traction motor control 108*a* at block (694). As illustrated in FIG. 6C, after the determination of the left and right target values at blocks (682), (686), (690) and (694), the process continues at block (664).

FIG. 7 illustrates an anti-slip flow diagram 700 of another example embodiment. The anti-slip flow diagram 700 illustrates an anti-slip mode that may be selected when it is desired to reduce the possibility of the drive wheels 122*a* and 122*b* slipping on the turf. The anti-slip flow diagram 700 starts at block (702) when the vehicle control 101 is activated. At block (704) it is determined if the anti-slip mode is selected. If the anti-slip mode is not selected at block (704), operation of the vehicle 100 operates in a default mode or other selected mode at block (706). The process then continues at block (704).

If the anti-slip mode is selected at block (704), a rate of change of the left user input 104*b* is monitored at block (708) and a rate of change of the right user input 104*a* is monitored at block (716). At block (710) it is determined if the rate of change in the left user input 104*b* is greater than a threshold. If the rate of change of the left user input 104*b* is not determined to be greater than the threshold value at block (710), the commanded rate of change is allowed at block (712) and the process then continues at block (704). If the rate of change of the left user input 104*b* is determined to be greater than the threshold value at block (710), a command signal is provided to the left traction motor control 108*b* to ramp the rate of change at the threshold value at block (714), and the process then continues at block (704).

At block (718) it is determined if the rate of change in the right user input 104*a* is greater than a threshold. If the rate of change of the right user input 104*a* is not determined to be greater than the threshold value at block (718), the commanded rate of change is allowed at block (720) and the process then continues at block (704). If the rate of change of the right user input 104*a* is determined to be greater than the threshold value at block (718), a command signal is provided to the right traction motor control 108*a* to ramp the rate of change at the threshold value at block (722) and the process then continues at block (704). Hence, in the anti-slip mode, the inputs signals that control the right and left traction motors are overridden when needed to initiate an anti-slip maneuver. In another example, the system monitors wheel speed and determines if the rate of change exceeds a threshold to limit the rate of change of wheel acceleration. The anti-slip mode is another example of an operation mode that may be provide without requiring a user to select the mode.

Figure 8:
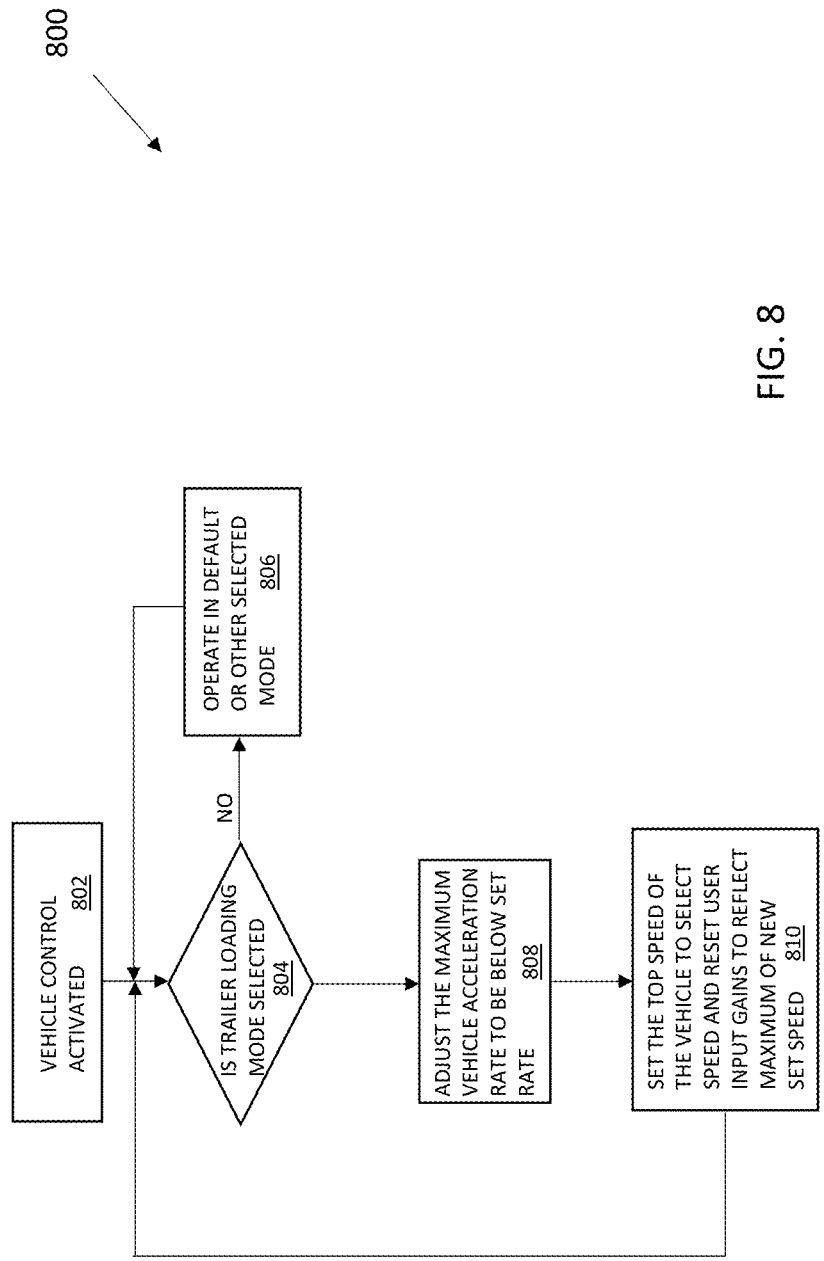
FIG. 8 illustrates a trailer loading flow diagram according to one exemplary embodiment.

FIG. 8 illustrates a trailer loading flow diagram 800 of another example embodiment. The trailer loading flow diagram 800 illustrates trailer loading mode that may be selected when loading the vehicle 100 on a trailer. The trailer loading mode allows the operator to finely control the movement of the vehicle 100 which is helpful in tight spaces such as a trailer. The trailer loading flow diagram 800 starts at block (802) when the vehicle control 101 is activated. At block (804) it is determined if the trailer loading mode is selected. If the trailer loading mode is not selected at block (804), the vehicle 100 operates in a default mode or other selected mode at block (806) and the process continues at block (804).

If the trailer loading mode is selected at block (804), a maximum vehicle acceleration rate is adjusted to be below a set acceleration rate at block (808). A top speed of the vehicle 100 may also be set to a select speed and a reset of user input gains is set to reflect the new maximum top vehicle speed at full user input at block (810). The process then continues at block (804).

Figure 9:
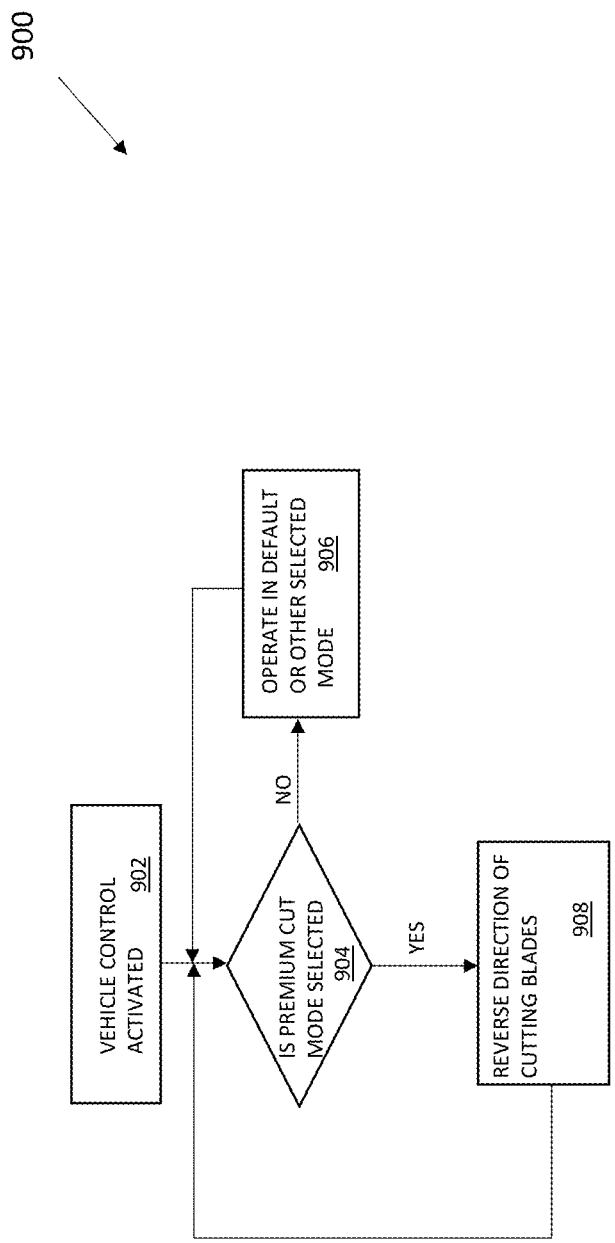
FIG. 9 illustrates a premium cut flow diagram according to one exemplary embodiment.

FIG. 9 illustrates a premium cut flow diagram 900 of another example embodiment. The premium cut flow diagram 900 illustrates premium cut mode that may be selected to achieve a desired mow pattern in cut grass or change relationship between the cut grass and the mower's direction. The premium cut flow diagram 900 starts at block (902) when the vehicle control 101 is activated. At block (904) it is determined if the premium cut mode is selected. If the premium cut mode is not selected at block (904), operation of the vehicle 100 operates in a default mode or other selected mode at block (906) and the process continues at block (904). If the premium cut mode is selected at block (904), the direction of rotation of at least one cutting blade in a mower deck of the vehicle 100 is reversed at block (908). The process then continues at block (904).

Figure 10A:
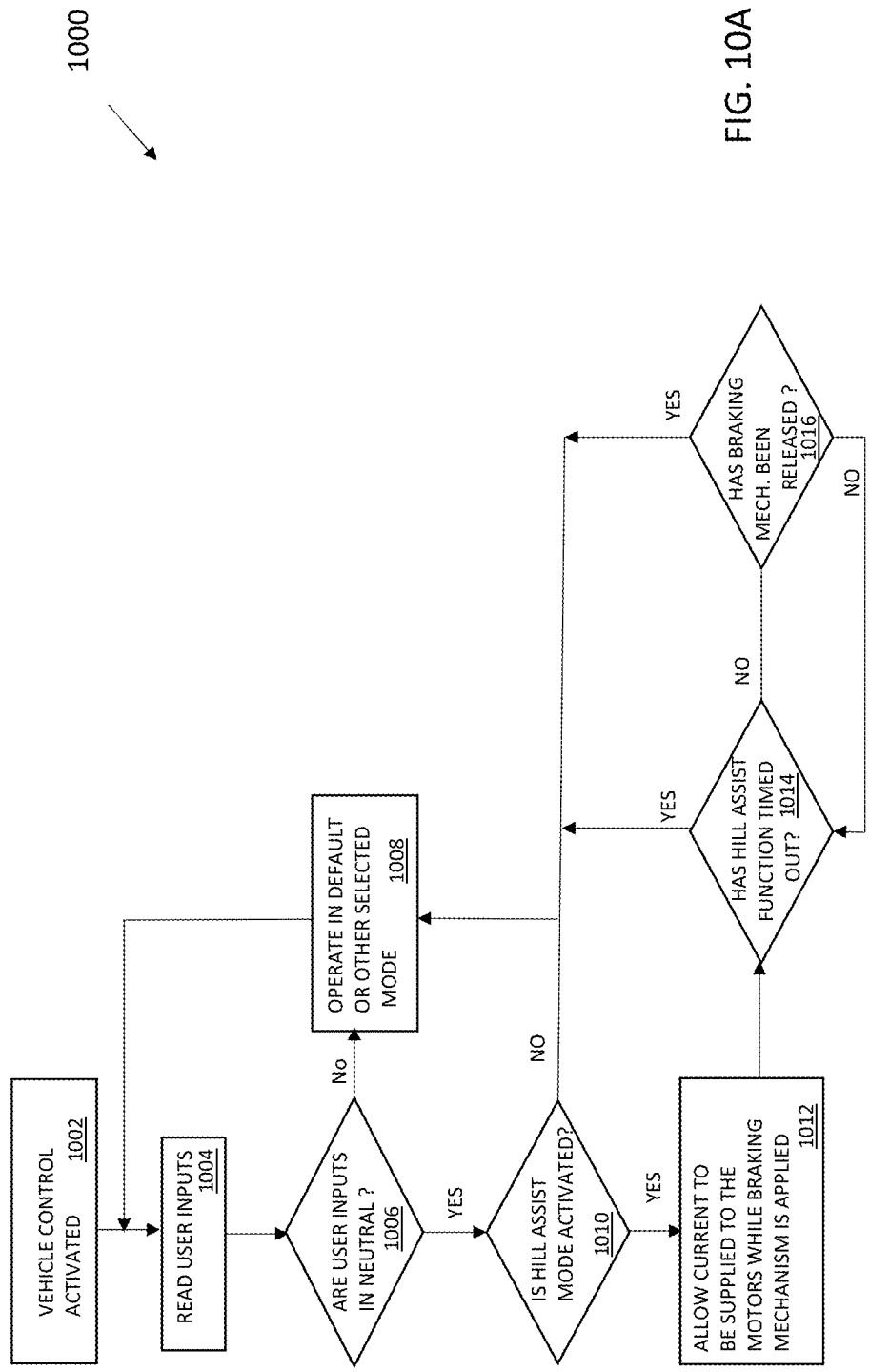
FIG. 10A illustrates a hill assist hold in place flow diagram according to one exemplary embodiment.

FIG. 10A illustrates a hill assist hold in place restart flow diagram 1000 of another example embodiment. In this example, the hill assist is used to prevent rollback when stopped on a hill. The vehicle maybe held in place by an electrical system, a mechanical system, a hydraulic system, etc. This hill assist may be activated when the vehicle is stopped or in neutral.

The hill assist hold in place flow diagram 1000 illustrates a hill assist restart mode. The hill assist restart mode aids the user in restarting the vehicle on a hill once the vehicle has stopped. The hill assist hold in place flow diagram 1000 starts at block (1002) when the vehicle control is activated. At block (1004) the user inputs 104*a* and 104*b* are read. It is determined at block (1006) if the user inputs 104*a* and 104*b* are in neutral. If it is determined the user inputs are not in neutral at block (1006), operation of the vehicle operates in a default mode or other selected mode at block (1008) and the process continues at block (1004).

If it is determined the user inputs 104*a* and 104*b* are in neutral at block (1006), it is then determined if the hill assist restart mode is activated at block (1010). If it is determined the hill assist restart mode is not activated at block (1010), the vehicle 100 operates in a default mode or other selected mode at block (1008) and the process continues at block (1004). If it is determined the hill assist restart mode is activated at block (1010), current is allowed to be supplied to the motors 110*a* and 110*b* while a braking mechanism is applied at block (1012). The braking mechanism may be an electrical braking mechanism used to stop motor rotation of vehicle movement (via current, coil short, etc.) or a mechanical device such as a motor brake, transmission brake, vehicle brake, etc. that are activated by any one of, but not limited to, hydraulic, electrical, mechanical systems.

It is then determined if the hill assist restart function has been timed out at block (1014). If it is determined the hill assist restart function has been timed out at block (1014), the vehicle operates in a default mode or other selected mode at block (1008) and the process continues at block (1004). If it is determined the hill assist restart function has not been timed out at block (1014), it is then determined at block (1016) if the braking mechanism has been released. If it has not been released, the process continues at block (1014). If it is determined at block 1016 the braking mechanism has been released, operation of the vehicle operates in a default mode or other selected mode at block (1008) and the process continues at block (1004).

FIG. 10B illustrates a hill assist restart flow diagram 1020 of another example embodiment. In this example, the hill assist aids in a restart on a hill. This example allows modulation between the brake and power to the wheels. This is helpful when the vehicle is stopped and pointed up a steep hill. Without a hill assist restart function, the vehicle will roll back when the brake is released. Once the power is applied the vehicle will cease rolling back and start moving forward. There is a tendency in this situation for the operator to overcompensate for the backward roll by applying too much power in the forward direction which may result in the front wheels losing contact with the ground. The hill assist restart mode is used to prevent rollback when stopped on a hill. The vehicle maybe held in place by an electrical system, a mechanical system, a hydraulic system, etc.

The embodiment illustrated in the hill assist restart flow diagram 1020 aids the user in restarting the vehicle on a hill once the vehicle has stopped. The hill assist restart flow diagram 1020 starts at block (1022) when the vehicle control is activated. At block (1024) the user inputs 104*a* and 104*b* are read. It is determined at block (1026) it is determined if the hill assist restart mode is activated. If it is determined the hill assist restart mode is not activated at block (1026), the vehicle 100 operates in a default mode or other selected mode at block (1028) and the process continues at block (1024). If it is determined the hill assist restart mode is activated at block (1026), a current is allowed to be supplied to the motors 110*a* and 110*b* while a braking mechanism is applied at block (1030). The braking mechanism may be an electrical braking mechanism used to stop motor rotation of vehicle movement (via current, coil short, etc.) or a mechanical device such as a motor brake, transmission brake, vehicle brake, etc. that are activated by any one of, but not limited to, hydraulic, electrical, mechanical systems.

It is then determined if the hill assist restart function has been timed out at block (1032). If it is determined the hill assist restart function has been timed out at block (1032), the vehicle operates in a default mode or other selected mode at block (1028) and the process continues at block (1024). If it is determined the hill assist restart function has not been timed out at block (1032), the process continues at block (1030) until such time as the hill assist function is timed out at block (1032).

Figure 11:
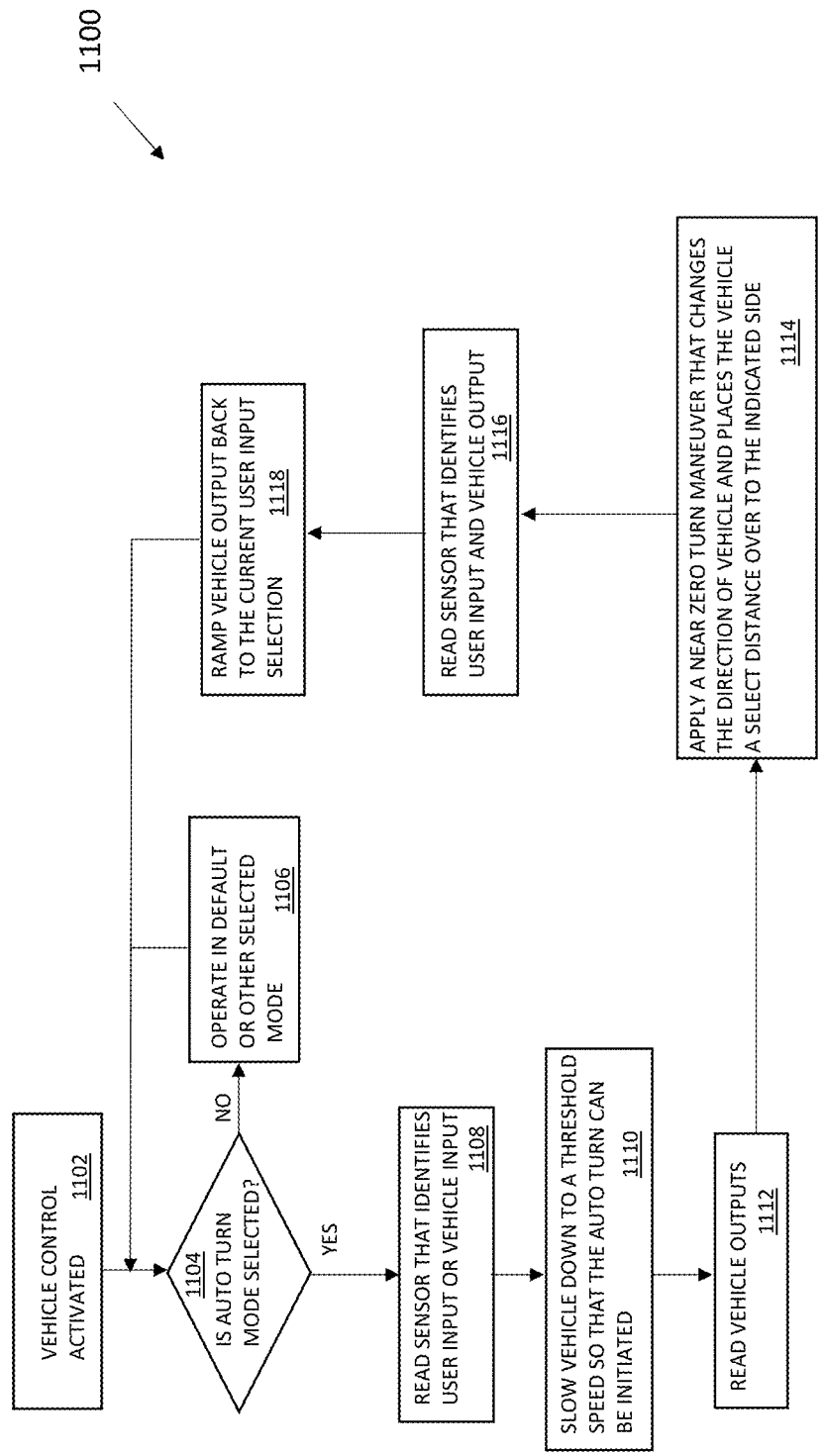
FIG. 11 illustrates an auto zero turn flow diagram according to one exemplary embodiment.

FIG. 11 illustrates an auto zero turn flow diagram 1100 of another example embodiment. The auto zero turn flow diagram 1100 illustrates an auto zero turn mode that assist the user in making a 180 degree turn with a select displacement over from a desired or indicated side. The auto zero turn flow diagram 1100 starts at block (1102) when the vehicle control 101 is activated. At block (1104) it is determined if the auto zero turn mode is selected. If the auto zero mode is not selected at block (1104), the vehicle 100 operates in a default mode or other selected mode at block (1106) and the process continues at block (1104).

If the auto zero turn mode is selected at block (1104), a sensor is read that identifies if a user input or a vehicle input is being used to control the vehicle at block (1108). At block (1110) the vehicle 100 is slowed down to a threshold speed so that the auto turn can be initiated independent of a user input. The vehicle outputs are read at block (1112). A near zero turn maneuver is applied that changes the direction of the vehicle 100 and places the vehicle 100 a select distance over to the indicated side (1114) so the vehicle 100 is positioned next to a past travel path. A sensor is read that identifies user input and vehicle output at block (1116). The block (1118) the vehicle output is ramped back to the current user input selection. The process then continues at block (1104).

Figure 12C:
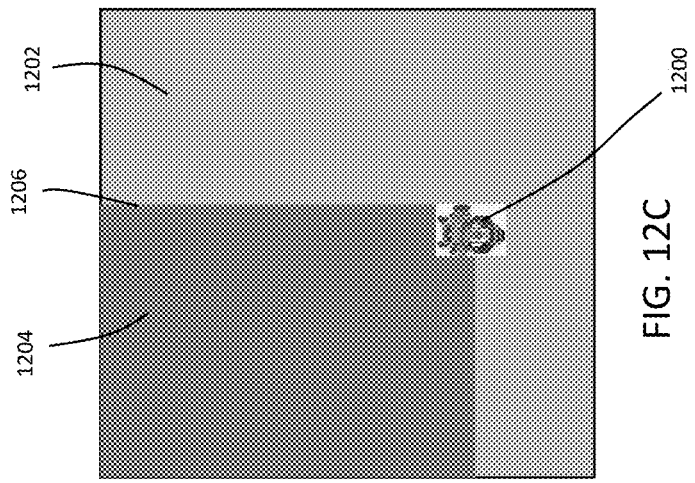
FIG. 12C illustrates the area of grass that is being cut of FIG. 12A with the position of the mower at the completion of the auto zero turn according to one exemplary embodiment.
Figure 12B:
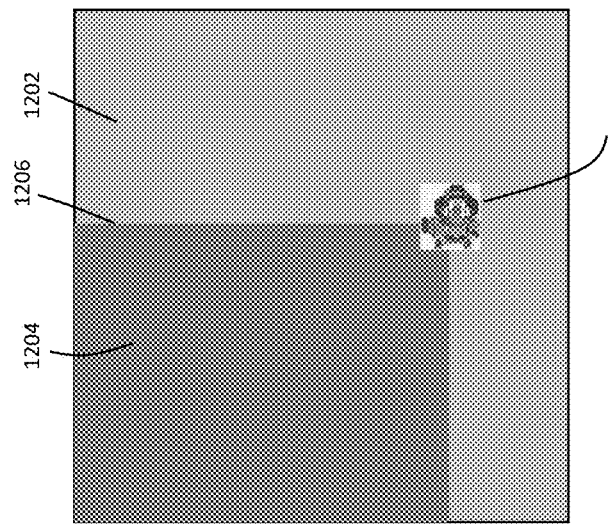
FIG. 12B illustrates the area of grass that is being cut of FIG. 12A with the mower positioned in the middle of the auto zero turn according to one exemplary embodiment.
Figure 12A:
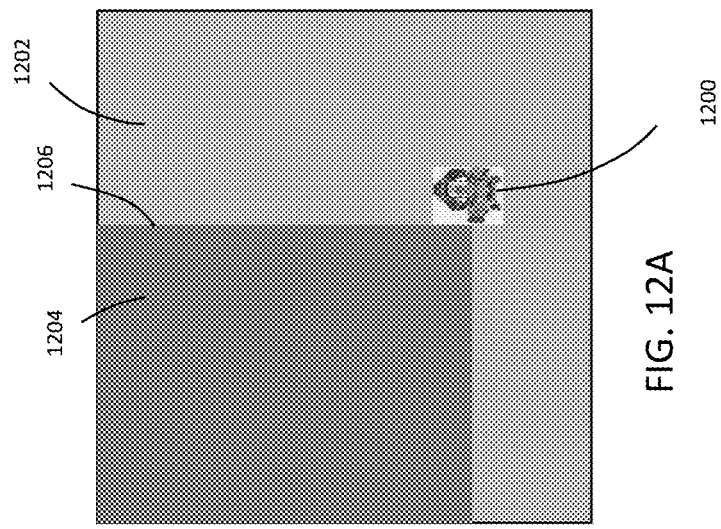
FIG. 12A illustrates an area of grass that is being cut with a mower with an auto zero turn mode activated at the end of a cut-line according to one exemplary embodiment.

An illustration of how the auto zero turn mode works is further described in view of the mowing illustration of FIGS. 12A, 12B and 12C. The FIGS. 12A, 12B and 12C illustrate an area of grass that is being cut. The area of grass includes a cut section 1202 and an uncut section 1204. FIG. 12A illustrates a mower 1200 at an end of a cut-line 1206 between the uncut section 1204 and the cut section 1202. When the mower 1200 reaches this point, the user (or operator) may select the auto zero turn mode with the mode select interface 106. In one example embodiment, the mode select interface 106 is a pair of buttons with each button located on either the right or left user inputs 105*a* or 105*b*

(depending on the direction of the desired turn). FIG. 12B illustrates the mower 1200 during the middle of an auto zero turn when a right button was pushed to activate the auto zero turn mode. FIG. 12C illustrates the position of the mower 1200 after the completion of the auto zero turn. As illustrated, the mower 1200 is now positioned a select distance over to the right of cut-line 1206 to start the next adjacent cut path. In an embodiment, at any time during an auto zero turn the auto zero turn mode is deselected, the vehicle 100 will return to operate in its default mode or other selected mode. Deselection may occur with the mode select interface 106 or other select user input.

EXAMPLE EMBODIMENTS

Example 1 includes a zero-turn vehicle including a mode selection interface, a memory and at least one controller. The mode selection interface provides a mode section input for a user. The memory is used to store mode instructions relating to at least one operation mode. The at least one controller in communication with the mode selection interface and the memory, the at least one controller configured to selectively modify normal operating characteristics of the zero-turn vehicle based the mode selection input from the user by implementing the stored mode instructions associated with the mode selection input.

Example 2 includes the zero-turn vehicle of Example 1, wherein the at least one operation mode includes at least one of a straight mode, a turf friendly mode, an anti-slip mode, a trailer loading mode, a hill assist mode and an auto turn mode.

Example 3 includes the zero-turn vehicle of any of the Examples 1-2, further including, a first drive wheel, a first traction motor, a second drive wheel, and a second traction motor. The first traction motor is coupled to provide torque to the first drive wheel. The first traction motor is in communication with the at least one controller. The second traction motor is coupled to provide torque to the second drive wheel. The second traction motor is in communication with the at least one controller. The at least one controller is configured to at least vary the torque provided by one of the first traction motor and the second traction motor based on at least one of mode instructions associated with a selected operation mode, user inputs and sensor data.

Example 4, includes the zero-turn vehicle of Example 3, further including a first user input to generate first user input signals used by the at least one controller to control the first traction motor and a second user input to generate second user input signals used by the at least one controller to control the second traction motor.

Example 5 includes the zero-turn vehicle of Example 4, wherein the selectively modify normal operating characteristics includes selectively overriding at least one of the user input signals from at least one of the first user input and the second user input.

Example 6 includes the zero-turn vehicle of Example 4, wherein the selectively modify normal operating characteristics includes adjusting a rate of change associated with at least one of the first user input and the second user input.

Example 7 includes the zero-turn vehicle of Example 4, wherein the selectively modify normal operating characteristics includes adjusting user input gains associated with the first user input and second user input.

Example 8 includes the zero-turn vehicle of Example 1, wherein the selectively modify normal operating characteristics includes setting at least one of a maximum vehicle acceleration rate and maximum vehicle speed.

Example 9 includes the zero-turn vehicle of Example 1, further including at least one deck motor to rotate a cutting blade. The selectively modify normal operating characteristics includes reversing the rotation of the at least one deck motor.

Example 10 includes the zero-turn vehicle of Examples 1, further wherein the selectively modify normal operating characteristics includes applying a braking mechanism while torque is being applied to at least one of a first drive wheel and a second drive wheel.

Example 11 includes the zero-turn vehicle of any of the Example 1, wherein the selectively modify normal operating characteristics includes slowing the vehicle down independent of at least a user input to initiate a turn maneuver.

Example 12 includes a zero-turn vehicle including a first drive wheel, a first traction motor, a second drive wheel, second traction motor, at least one user input, a memory and at least one controller. The first traction motor is coupled to provide torque to the first drive wheel. The second traction motor is coupled to provide torque to the second drive wheel. The at least one user input is used to generate at least one of a vehicle direction signals, vehicle speed signals and vehicle acceleration signals. The memory is used to store mode instructions relating to operation modes of the zero-turn vehicle. The least one controller is in communication with the first traction motor, the second traction motor and the memory. The at least one controller is configured to implement the mode instructions for at least one operation mode to cause at least one first and second traction control motors to vary at least one of torque, RPM and power independent of at least one of vehicle direction signals, vehicle speed signals, and acceleration signals from the at least one user input.

Example 13 includes a zero-turn vehicle of Example 12, wherein the at least one operation mode is one of a turf friendly mode and a straight mode. The one of the turf friendly mode and the straight mode includes mode instructions based on a difference between control signals sent to the first traction motor and the second traction motor generated from the at least one vehicle direction signals, vehicle speed signals, and acceleration signals.

Example 14 includes the zero-turn vehicle of Example 12, wherein the at least one operation mode is an anti-slip mode. The anti-slip mode includes mode instructions based on a difference between a rate of change associated with control signals sent to the first traction motor and second traction motor generated from the at least one vehicle direction signals, vehicle speed signals, and acceleration signals.

Example 15 includes the zero-turn vehicle of any of the Examples 12-14, further including a mode selection interface to provide a mode section input for a user. The at least one controller in communication with the mode selection interface to determine the mode instructions to implement.

Example 16 includes a method of controlling a zero-turn vehicle. The method includes generating at least one of vehicle direction signals, vehicle speed signals, and vehicle acceleration signals with at least one user input; modifying at least one of the vehicle direction signals, vehicle speed signals, and vehicle acceleration signals from the at least one user input based on operational mode instructions to generate first traction control signals configured to control a first traction motor and second traction control signals configured to control a second traction motor, wherein the operational mode instructions modify the at least one vehicle direction signals, vehicle speed signals and vehicle acceleration signals based at least in part on a difference between the at least one vehicle direction signals, the vehicle speed signals and the vehicle acceleration signals used to control the first traction control motor and the second traction control motor.

Example 17 includes the method of Example 16, wherein the at least one operation mode is one of a turf friendly mode, straight mode, and an anti-slip mode.

Example 18 includes the method of Example 16, further including reversing the direction of at least one mower blade based on operational instructions associated with a premium cut mode.

Example 19 includes the method of Example 16, further including activating a holding mechanism while power is applied to the first traction control motor and the second traction control motor based on operational instructions associated with a hill assist mode.

Example 20 includes the method of Example 16, further including applying a turn maneuver that changes the direction of the zero-turn vehicle and places the vehicle a select distance from a past travel path in an auto turn mode.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A zero-turn vehicle comprising:
   a mode selection interface to provide a mode section input for a user;
   a memory to store mode instructions relating to at least one operation mode; and
   at least one controller in communication with the mode selection interface and the memory, the at least one controller configured to selectively modify normal operating characteristics of the zero-turn vehicle based the mode selection input from the user by implementing the stored mode instructions associated with the mode selection input;
   a first drive wheel;
   a first traction motor coupled to provide torque to the first drive wheel, the first traction motor in communication with the at least one controller;
   a second drive wheel;
   a second traction motor coupled to provide torque to the second drive wheel, the second traction motor in communication with the at least one controller, wherein the at least one controller is configured to vary at least one of torque, revolutions per minute (RPM) and power provided by one of the first traction motor and the second traction motor based on at least one of mode instructions associated with a selected operation mode, user inputs and sensor data;
   a first user input to generate first user input signals used by the at least one controller to control the first traction motor;
   a second user input to generate second user input signals used by the at least one controller to control the second traction motor; and
   wherein the selectively modifying normal operating characteristics includes adjusting a rate of change associated with at least one of the first user input and the second user input.

2. The zero-turn vehicle of claim 1, wherein the at least one operation mode includes at least one of a straight mode, a turf friendly mode, an anti-slip mode, a trailer loading mode, a hill assist mode and an auto turn mode.

3. The zero-turn vehicle of claim 1, wherein the selectively modify normal operating characteristics includes selectively overriding at least one of the user input signals from at least one of the first user input and the second user input.

4. The zero-turn vehicle of claim 1, further wherein the selectively modify normal operating characteristics includes applying a braking mechanism while torque is being applied to at least one of a first drive wheel and a second drive wheel.

5. The zero-turn vehicle of claim 1, further comprising:
   wherein the selectively modify normal operating characteristics includes slowing the vehicle down independent of at least a user input to initiate a turn maneuver, performing a hundred and eighty degree turn placing the zero-turn vehicle one vehicle width over from a prior cut path.

6. The A zero-turn vehicle of claim 4, comprising:
   a mode selection interface to provide a mode section input for a user;
   a memory to store mode instructions relating to at least one operation mode; and
   at least one controller in communication with the mode selection interface and the memory, the at least one controller configured to selectively modify normal operating characteristics of the zero-turn vehicle based the mode selection input from the user by implementing the stored mode instructions associated with the mode selection input, a first drive wheel;
   a first traction motor coupled to provide torque to the first drive wheel, the first traction motor in communication with the at least one controller;
   a second drive wheel;
   a second traction motor coupled to provide torque to the second drive wheel, the second traction motor in communication with the at least one controller, wherein the at least one controller is configured to vary at least one of torque, revolutions per minute (RPM) and power provided by one of the first traction motor and the second traction motor based on at least one of mode instructions associated with a selected operation mode, user inputs and sensor data;
   a first user input to generate first user input signals used by the at least one controller to control the first traction motor; and
   a second user input to generate second user input signals used by the at least one controller to control the second traction motor; and
   wherein the selectively modifying normal operating characteristics includes adjusting user input gains associated with the first user input and second user input.

7. The zero-turn vehicle of claim 6, wherein the selectively modify normal operating characteristics includes setting at least one of a maximum vehicle acceleration rate and maximum vehicle speed.

8. The A zero-turn vehicle comprising:
   a mode selection interface to provide a mode section input for a user;
   a memory to store mode instructions relating to at least one operation mode;
   at least one controller in communication with the mode selection interface and the memory, the at least one controller configured to selectively modify normal operating characteristics of the zero-turn vehicle based the mode selection input from the user by implementing the stored mode instructions associated with the mode selection input; and at least one deck motor to rotate a cutting blade, wherein the selectively modifying normal operating characteristics includes reversing the rotation of the at least one deck motor.

9. A zero-turn vehicle comprising:
a first drive wheel;
a first traction motor coupled to provide torque to the first drive wheel;
a second drive wheel;
a second traction motor coupled to provide torque to the second drive wheel;
at least one user input to generate at least one of a vehicle direction signals, vehicle speed signals and vehicle acceleration signals;
a memory to store mode instructions relating to operation modes of the zero-turn vehicle;
at least one controller in communication with the first traction motor, the second traction motor and the memory, the at least one controller configured to implement the mode instructions for at least one operation mode to cause at least one first and second traction control motors to vary at least one of torque, revolutions per minute (RPM) and power independent of at least one of the vehicle direction signals, the vehicle speed signals, and the vehicle acceleration signals from the at least one user input; and
wherein the at least one operation mode is an anti-slip mode, the anti-slip mode including mode instructions based on a difference between a rate of change associated with control signals sent to the first traction motor and second traction motor generated from the at least one vehicle direction signals, vehicle speed signals and vehicle acceleration signals.

10. The zero-turn vehicle of claim 9, wherein the at least one operation mode is one of a turf friendly mode and a straight mode, the one of the turf friendly mode and the straight mode including mode instructions based on a difference between control signals sent to the first traction motor and the second traction motor generated from the at least one vehicle direction signals, vehicle speed signals, and vehicle acceleration signals.

11. The zero-turn vehicle of claim 9, further comprising:
a mode selection interface to provide a mode section input for a user, the at least one controller in communication with the mode selection interface to determine the mode instructions to implement.

12. A method of controlling a zero-turn vehicle, the method comprising:
generating at least one of vehicle direction signals, vehicle speed signals, and vehicle acceleration signals with at least one user input; and
modifying at least one of the vehicle direction signals, vehicle speed signals and vehicle acceleration signals from the at least one user input based on operational mode instructions to generate first traction control signals configured to control a first traction motor and second traction control signals configured to control a second traction motor by adjusting at least one of a rate of change and input gains associated with the at least one user input, wherein the operational mode instructions modify the at least one vehicle direction signals, vehicle speed signals, and vehicle acceleration signals based at least in part on a difference between the at least one vehicle direction signals, the vehicle speed signals, and the vehicle acceleration signals used to control the first traction control motor and the second traction control motor.

13. The method of claim 12, wherein the at least one operation mode is one of a turf friendly mode, straight mode and an anti-slip mode.

14. The method of claim 12, further comprising;
reversing the direction of at least one mower blade based on operational instructions associated with a premium cut mode.

15. The method of claim 12, further comprising:
activating a holding mechanism while power is applied to the first traction control motor and the second traction control motor based on operational instructions associated with a hill assist mode.

16. The method of claim 12, further comprising:
applying a turn maneuver that changes the direction of the zero-turn vehicle and places the vehicle a select distance from a past travel path in an auto turn mode.

* * * * *

UNITED STATES PATENT AND TRADEMARK OFFICE
CERTIFICATE OF CORRECTION

PATENT NO. : 12,156,493 B2
APPLICATION NO. : 17/741137
DATED : December 3, 2024
INVENTOR(S) : Wendt et al.

Page 1 of 1

It is certified that error appears in the above-identified patent and that said Letters Patent is hereby corrected as shown below:

In the Claims

Column 16, Line 17, Claim 5 please delete "of claim 4," between "zero-turn vehicle" and "comprising:".

Column 16, Line 17, Claim 5 please delete "The" between "6." and "A".

Column 16, Line 56, Claim 8 please delete "The" between "8." and "A.".

Signed and Sealed this
Twenty-eighth Day of January, 2025

Coke Morgan Stewart
*Acting Director of the United States Patent and Trademark Office*